Patented Aug. 8, 1950

2,518,266

UNITED STATES PATENT OFFICE 2,518,266

QUATERNARY AMMONIUM TEXTILE TREATMENT AGENTS AND METHOD OF APPLICATION THEREOF

William Baird, Thomas Barr, and Arthur Lowe, Blackley, Manchester, England, assignors to Imperial Chemical Industries Limited, a corporation of Great Britain No Drawing. Application July 28, 1947, Serial No. 764,259. In Great Britain August 14, 1946

7 Claims. (Cl. 260—295)

This invention relates to the manufacture of new chemical compounds and to their use in treating textile materials, especially for the purpose of conferring anti-shrink properties on wool.

According to the present invention we provide a process for the manufacture of new chemical compounds which comprises causing an aliphatic or heterocyclic tertiary amine or thiourea or a derivative thereof to interact with one or more halogenomethyl compounds of the formula

wherein R stands for an aliphatic radical, substituted or not, R' stands for hydrogen or an organic residue, X stands for a halogen and $n$ stands for a whole number greater than 1.

The halogenomethyl compounds which are used as starting materials are derivatives of compounds of the formula $R(OH)_n$, wherein R and $n$ have the significance stated above. They may conveniently be made by treating the compound $R(OH)_n$ with phosgene and by treating the so-obtained chloroformic ester with ammonia or with a primary amine, whereby a polycarbamate of the formula $R(OCONHR')_n$ is obtained, followed by treatment of the said polycarbamate with formaldehyde (or a polymer thereof) and a hydrogen halide or other halogenating agent, for example, phosgene, thionyl chloride or phosphorus pentachloride, or with a product of the interaction of formaldehyde and a hydrogen halide, namely a dihalogenodimethyl ether. Alternatively, the said polycarbamate and either a part or the whole of the formaldehyde may first be combined to form a methylol carbamate which is subsequently brought into reaction with the hydrogen halide or other halogenating agent and, if desired, with further formaldehyde, or the said polycarbamate and hydrogen halide may be first combined to form a hydrohalide of the polycarbamate which is subsequently brought into reaction with the formaldehyde, or a methylol compound of the said polycarbamate may be brought into reaction with a dihalogenodimethyl ether. Alternatively in place of the methylol derivative of the polycarbamate used as described above, the alkoxymethyl derivative of the polycarbamate may be used.

As suitable compounds and mixtures of compounds of the formula $R(OH)_n$ for making the halogenomethyl compounds there may be mentioned, for example, ethylene glycol, octadecane-1:12-diol, castor oil, hydrogenated castor oil, glycerol and N:N'-ethylene-bis-ricinoleamide.

Thus as suitable halogenomethyl compounds to be used in the process of this invention there may be mentioned, for example, ethylene-1:2-bis-chloromethylcarbamate, N:N'-dichloromethyl-(octadecane-1:12-diol bis-carbamate), N:N':N''-trichloromethyl-(triolein-11:11':11''-triol triscarbamate) and N:N':N''-trichloromethyl-(tristearin-11:11':11''-triol triscarbamate).

As suitable aliphatic or heterocyclic tertiary amines or derivatives of thiourea to be combined with the halogenomethyl compounds there may be mentioned, for example, trimethylamine, triethylamine, N:N'-tetramethylenediamine, dimethylcyclohexylamine, diethylcyclohexylamine, N-methylpiperidine, pyridine, α-picoline, hexamethylene tetramine, thiourea, tetra-methylthiourea.

In carrying the invention into practical efect the halogenomethyl compound or compounds and the tertiary amine or thiourea or a derivative thereof are mixed, optionally in presence of a solvent or diluent. The reaction is exothermic and it may be desirable to moderate its violence by using a large bulk of solvent or diluent or by applying external cooling means.

The new compounds are white or pale coloured or clear waxy or resinous solids which are soluble in water and alcohols, and sparingly soluble in ether and acetone. Those compounds containing long aliphatic chains are also soluble in benzene, toluene, chloroform and ethylene dichloride and their aqueous solutions foam on shaking but when they are boiled the foaming power diminishes. When the compounds themselves are heated above 100° C. they decompose, forming water-insoluble resinous substances.

By a further feature of the invention the new compounds are applied to textile materials which may be of animal or vegetable origin or composed of regenerated cellulose esters or ethers to give them improved properties including shrink-resistance and/or water-repellence and/or softness. This feature of the invention comprises impregnating the said textile materials with a solution or suspension of one or more of the new compounds in water or in a suitable organic liquid, at a convenient temperature, for example at a temperature below 60° C., and subsequently drying the impregnated material and heating to such a temperature that the said new compounds undergo decomposition, for example to a temperature of about 150° C.

An alkaline substance or a substance that has an acid-binding action, for example sodium acetate, may be added to the impregnating fluid, or may be applied to the material separately, in order to prevent or minimise tendering when the textile material comprises cellulose or cellulose esters or ethers.

Other textile finishing agents may also be added to the impregnating fluid. Thus, for example, polyvalent metal salts, for example aluminium acetate or water-repellent waxes, for example paraffin wax, montan wax, carnauba wax and beeswax, may be added in order to improve the water-repellent properties of the textile materials. Other water-repellent agents may likewise be added, particularly water-insoluble compounds closely related chemically to the new compounds, for example methylol-stearamide, methylenedistearamide, methyloloctadecylcarbamate, methylenedistearate and methylol and alkoxymethyl derivatives of polycarbamates. Many of these compounds appear to be dispersed in the impregnating fluid by the new compounds.

By a further feature of the invention the new compounds may be applied in conjunction with compounds which are used to confer crease-resistant properties on textile materials, for example, condensation products of formaldehyde with phenols or with urea or urea derivatives, the two treatment agents being applied either separately or simultaneously, i. e. from the same bath.

The invention is illustrated but not limited by the following examples in which parts and percentages are by weight.

Example 1

358 parts of octadecane-1:12-diol bis-carbamate are dissolved in 2000 parts of dry benzene and 150 parts of paraformaldehyde are added to the solution. Gaseous hydrogen chloride is passed into the stirred mixture keeping the temperature below 40° C. until no paraformaldehyde remains undissolved. The aqueous layer is then separated and the benzene solution is concentrated under reduced pressure at 60° C. The residual oil is a chloromethyl compound.

The chloromethyl compound so obtained is mixed at room temperature with 200 parts of pyridine. Heat is evolved. The mixture is allowed to cool and it then forms a white waxy solid which may be purified by dissolving in chloroform and precipitating with acetone. This solid is a quaternary ammonium salt; it dissolves in water to give clear foaming solutions which cease to foam and become cloudy on prolonged boiling.

Example 2

42.5 parts of the polycarbamates obtained by treating hydrogenated castor oil with phosgene and then with ammonia, consisting essentially of tristearin-11:11':11''-triol tris-carbamate are dissolved in 80 parts of benzene and 5.4 parts of paraformaldehyde are added. Gaseous hydrogen chloride is then passed into the resulting suspension at 30° C. until all the paraformaldehyde has dissolved. The benzene solution is decanted from the water formed and the solvent is removed by evaporation under reduced pressure at 60° C. The residual wax is a mixture of chloromethyl compounds.

The mixture of chloromethyl compounds so obtained is mixed with 15 parts of pyridine. Heat is evolved and a clear viscous resin is formed. This resin is a mixture of quaternary ammonium salts; it dissolves very readily in water to give clear foaming solutions.

Example 3

200 parts of the polycarbamate obtained by treating castor oil with phosgene and then with ammonia, consisting essentially of triolein-11:11':11''-triol tris-carbamate, are dissolved in 350 parts of benzene and 24 parts of paraformaldehyde are added. Gaseous hydrogen chloride is passed through the suspension at 20° C. until all the paraformaldehyde has dissolved. The aqueous layer is separated and the solvent is evaporated from the benzene layer under reduced pressure at 60° C. The residual oil is a mixture of chloromethyl compounds.

The mixture of chloromethyl compounds so obtained is mixed with 50 parts of pyridine at room temperature. Heat is evolved and a clear viscous resin is formed.

This resin is a mixture of quaternary ammonium salts; it dissolves readily in water to give clear solutions.

Example 4

A light weight wool flannel is padded in an aqueous solution containing 10% of the product of Example 2, squeezed between rubber rollers to an uptake of approximately 100%, pre-dried at 50° C. and subsequently baked for 3 minutes at 140° C. The pattern thus prepared is milled by hand in comparison with an untreated pattern and shows an area shrinkage of 1.6% against 32.2% for the untreated.

Example 5

A light weight wool flannel is padded in an aqueous solution containing 10% of the product of Example 3, squeezed between rubber rollers to an uptake of approximately 100%, predried at 50° C. and subsequently baked for 3 minutes at 150° C. The pattern thus prepared when milled by hand in comparison with an untreated pattern shows an area shrinkage of 6% against 36.8% for the untreated.

The finish given to the wool is resistant to dry cleaning solvents such as ethanol, white spirit and trichloroethylene, and gives the fabric improved wearing properties, increasing the resistance to abrasion and increasing the breaking load. The handle of the material is not adversely affected.

Example 6

390 parts of the polycarbamates obtained by treating hydrogenated castor oil with phosgene and then with ammonia, consisting essentially of tristearin-11:11':11''-triol tris-carbamate, are dissolved in 2000 parts of benzene and 40 parts of paraformaldehyde are added. 131 parts of thionyl chloride are added and the mixture is stirred at 40–45° C. for 2 hours when all the paraformaldehyde has dissolved. The solvent is then removed by evaporation under reduced pressure at 40–45° C. The mixture of chloromethyl compounds so obtained is mixed with 90 parts of pyridine. Heat is evolved and a clear viscous resin is formed similar in properties to that described in Example 2.

Example 7

107 parts of tristearin-11:11':11''-triscarbamate are dissolved in 500 parts of ethylene dichloride and 35 parts of dichlorodimethyl ether are added. The mixture is then warmed to 40–45° C. for ½ hour and the reaction is completed by heating at 60° C. for 1½ hours. The solvent is then removed by evaporation under reduced pressure at 40–45° C. and the residual mixture of chloromethyl compounds is quaternised by mixing with 40 parts of pyridine. The reaction is exothermic and the clear viscous resin so obtained is similar in properties to that described in Example 2.

Example 8

870 parts of the polycarbamates obtained by treating hydrogenated castor oil with phosgene and then ammonia are dissolved in 3600 parts of ethylene dichloride and 99 parts of paraformaldehyde are added. Phosgene is passed into the suspension with stirring. Heat is evolved and the temperature rises to 25–30° C. When the initial reaction subsides the temperature is raised to 60–65° C. and the passage of phosgene is continued until about 300 parts have been passed and the paraformaldehyde is all in solution. The excess phosgene and hydrogen chloride are then removed by passing a stream of air and the solvent is distilled off under reduced pressure at 40–45° C. The residual chloromethyl compounds are then added during ½ hour to a solution of 193 parts of pyridine in 400 parts of isopropanol with vigorous stirring and cooling, the temperature being kept below 15° throughout the addition. The resulting product is a clear mobile liquid dissolving very readily in water to give clear foaming solutions.

If instead of the 400 parts of isopropanol in the above process 400 parts of sec-n-butanol or cyclohexanol are used, products possessing very similar properties are obtained.

Example 9

107 parts of the polycarbamates obtained by treating hydrogenated castor oil with phosgene and then ammonia are dissolved in 500 parts of ethylene dichloride and 11 parts of paraformaldehyde are added. Phosgene is passed into the suspension with stirring and the temperature is raised gradually to 60° C. When all the paraformaldehyde has passed into solution the excess phosgene and hydrogen chloride is removed by passage of a stream of air. The solution of chloromethyl compounds is added to 30 parts of pyridine and the solvent is removed by distillation under reduced pressure at 45–50° C. The resulting clear resin is really soluble in water to give clear foaming solutions.

Example 10

107 parts of the polycarbamates obtained by treating hydrogenated castor oil with phosgene and then ammonia are dissolved in 300 parts of benzene and 11 parts of paraformaldehyde are added. 36 parts of thionyl chloride are added and the mixture is stirred at 40–45° C. for 2 hours. The reaction mixture is filtered and the solvent is removed by evaporation under reduced pressure at 40–45° C. The residual chloromethyl compounds are then added to 80 parts of a 22% aqueous trimethylamine solution with stirring during 1 hour at 0–5° C. The resulting viscous solution is completely miscible with water giving foaming solutions.

Example 11

850 parts of the polycarbamates obtained by treating hydrogenated castor oil with phosgene and then with ammonia are dissolved in 3500 parts of ethylene dichloride and 97 parts of paraformaldehyde are added. Phosgene is then passed into the suspension at 60° C. until all the paraformaldehyde dissolves. This usually takes 2 hours. The excess phosgene and hydrogen chloride are removed by passing a stream of air for ½ hour and the solvent is then evaporated under reduced pressure at 40–45° C. The resulting chloromethyl compounds are then added with stirring during 1 hour to a solution of 185 parts of trimethylamine in 540 parts of n-butanol at 0–5° C. The resulting clear mobile liquid is readily soluble in water giving clear foaming solutions.

If instead of the 540 parts of n-butanol in the above process 540 parts of sec.-n-butanol, isopropanol, n-propanol or cyclohexanol are used, products possessing very similar properties are obtained.

Example 12

50 parts of the polycarbamates obtained by treating castor oil with phosgene and then methylamine, consisting essentially of triolein-11:11':11"-triol-tris-carbamate, are dissolved in 150 parts of benzene and 5.5 parts of paraformaldehyde are added. Gaseous hydrogen chloride is then passed into the resulting suspension at 5–10° C. until all the paraformaldehyde has dissolved. The benzene solution is decanted from the water formed and the solvent is removed by evaporation under reduced pressure at 40–45° C. The residual mixture of chloromethyl compounds is added to 12.5 parts of pyridine. Heat is evolved and a clear viscous resin formed; it dissolves very readily in water.

Example 13

60 parts of the polycarbamates obtained by treating castor oil with phosgene and then monoethanolamine are dissolved in 150 parts of benzene and 10 parts of paraformaldehyde are added. Gaseous hydrogen chloride is then passed into the resulting suspension at 5–10° C. until all the paraformaldehyde has dissolved. The benzene solution is decanted from the water formed and the solvent is removed by evaporation under reduced pressure at 40–45° C. The residual mixture of chloromethyl compounds is added to 25 parts of pyridine. Heat is evolved and a clear viscous resin is formed which dissolves very readily in water.

Example 14

60 parts of the polycarbamates obtained by treating hydrogenated castor oil with phosgene and then aniline are dissolved in 180 parts of benzene and 6.5 parts of paraformaldehyde are added. Gaseous hydrogen chloride is passed through the suspension at 5–10° C. until all the paraformaldehyde has dissolved. The aqueous layer is separated and the solvent is evaporated from the benzene layer under reduced pressure at 40–45° C. The residual mixture of chloromethyl compounds is mixed with 12.5 parts of pyridine at room temperature. Heat is evolved and a clear golden yellow viscous resin formed which dissolves readily in water.

Example 15

50 parts of the mixture of chloromethyl compounds obtained as described in Example 8 are added to a suspension of 12 parts of thiourea in 120 parts of isopropanol. The mixture is stirred for 4 hours at room temperature during which time the thiourea dissolves. The excess solvent is removed by evaporation under reduced pressure at 30–35° C. leaving a clear resin which is easily soluble in warm water.

Example 16

90 parts of the mixture of chloromethyl compounds obtained as described in Example 8 are added to a mixture of 30 parts of tetramethyl-thiourea in 120 parts of isopropanol and the mixture is stirred till a homogeneous solution is obtained. The excess solvent is removed in vacuo leaving a clear yellow resin which gives slightly translucent solutions in water.

Example 17

250 parts of the mixture of polycarbamates obtained by treating 11-hydroxystearic-N:N-dihydroxyethylamide with phosgene and then with ammonia are dissolved in 400 parts of benzene and 54 parts of paraformaldehyde are added. 179 parts of thionyl chloride are then added to the mixture with stirring at room temperature. When the initial vigorous reaction has subsided the temperature is raised to 40-45° C. and stirring continued for 2 hours. The reaction mixture is filtered and the solvent removed by distillation under reduced pressure. The residual mixture of chloromethyl compounds is then added to a solution of 125 parts of pyridine in 350 parts of benzene. Heat is evolved and a semi-solid resinous product is obtained. 100 parts of isopropanol are added and the solution thus obtained is concentrated by distillation under reduced pressure at 40° C. The residual viscous solution is completely miscible with water.

Example 18

30 parts of the product obtained as described in Example 8 are mixed with 30 parts of methylol stearamide and 30 parts of isopropanol. The whole is stirred at 50° C. until a homogeneous solution is obtained and then cooled forming a white paste which is easily dispersible in water.

Example 19

30 parts of the product obtained as described in Example 8 are mixed with 30 parts of aluminium stearate and 30 parts of isopropanol. The whole is stirred at 50° C. until the mixture thins out. On cooling, a white paste is obtained which is easily dispersible in water.

Example 20

116 parts of the mixture of polymethylolcarbamates obtained by treating hydrogenated castor oil with phosgene, then ammonia and then with paraformaldehyde, consisting essentially of tristearin-11:11':11''-triol tris-methylol carbamate, are added with stirring to a solution of 36 parts of thionyl chloride in 200 parts of ethylene dichloride. Heat is evolved and the reaction is completed by stirring at 40° C. for 1 hour. The solvent is then removed by distillation under reduced pressure at 40-45° C. The residual mixture of chloromethyl compounds is added to 25 parts of pyridine. Heat is evolved and a clear viscous resin formed which dissolves very readily in water to give clear foaming solutions.

Example 21

7 parts of ethylene-1:2-bis-carbamate, 4 parts of paraformaldehyde, 14 parts of thionyl chloride and 50 parts of ethylene dichloride are mixed and stirred. A slightly exothermic reaction ensues and when this ceases the mixture is warmed to 35° C. for 15 minutes. The mixture is then air blown for 15 minutes to remove sulphur dioxide and hydrogen chloride and the residual oil is added with stirring to 8 parts of pyridine. Heat is evolved and a sticky hygroscopic solid is formed which is very soluble in water. It may be purified by dissolving in a little alcohol and precipitating with acetone.

Example 22

7.5 parts of trimethylene-1:3-bis-carbamate, 4 parts of paraformaldehyde, 14 parts of thionyl chloride and 50 parts of ethylene dichloride are mixed and stirred. A slightly exothermic reaction ensues and when this ceases the temperature of the mixture is raised to 35° for 15 minutes. The solvent is then removed by evaporation under reduced pressure at 15-20° C. and the residual oil is added to 8 parts of pyridine. Heat is evolved and a sticky solid is formed which is readily soluble in water. When heated it forms a white insoluble mass.

If instead of the 7.5 parts of trimethylene-1:3-bis-carbamate, 8 parts of tetramethylene-1:4-bis-carbamate or 12.5 parts of decamethylene-1:10-bis-carbamate are used, products having very similar properties are obtained.

Example 23

38 parts of hexamethylene-1:6-bis-carbamate, 12 parts of paraformaldehyde and 300 parts of ethylene dichloride are mixed and 50 parts of thionyl chloride are added during 15 minutes. The temperature rises to 30° C. with evolution of hydrogen chloride and sulphur dioxide. The reaction is completed by warming to 40° C. for 15 minutes and the mixture is concentrated by evaporation under reduced pressure at 15-20° C. The residual oil is then mixed with 30 parts of pyridine whereby a clear viscous resin is formed. This resin is a mixture of quaternary ammonium salts; it dissolves very readily in water.

We claim:

1. New quaternary compounds of the formula R(OCONHCH₂AX)ₙ wherein R represents a radical of the group consisting of alkylene radicals, higher fatty acid esters of polyalkylols, and higher fatty acid amides of alkylene amines, X is a halogen radical, n is greater than 1 and A represents the radical of a nitrogenous compound selected from the group consisting of heterocyclic tertiary amines, aliphatic tertiary amines, thiourea and tetramethyl thiourea.

2. As a new compound, tristearin-11:11':11''-tris (carbamato methyl pyridinium)-trichloride having the structural formula

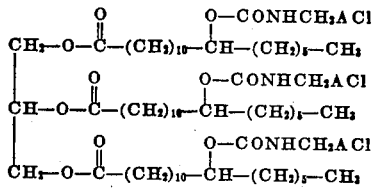

where A represents the radical

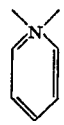

3. As a new compound, triolein-11:11':11''-tris (carbamato methyl pyridinium)-trichloride having the structural formula

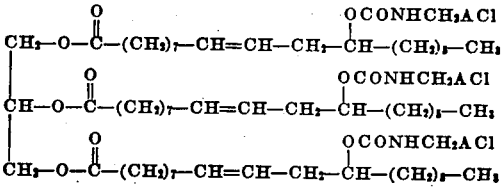

where A represents the formula

4. As a new compound, ethylene 1:2-bis (carbamato methyl pyridinium) dichloride having the structural formula

where A represents the radical

5. A process for the manufacture of the compounds claimed in claim 1 which comprises interacting a halogenomethyl compounds of the formula $R(OCONHCH_2X)_n$ where R represents a radical of the group consisting of alkylene radicals, higher fatty acid esters of polyalkylols and higher fatty acid amides of alkylene amines, X is a halogen radical and $n$ is greater than one, with a compound chosen from the group consisting of heterocyclic tertiary amines, aliphatic tertiary amines, thiourea and tetramethyl thiourea, and recovering the product formed.

6. A process for increasing the shrink resistance of textile materials wihch comprises treating said textile materials with the compounds claimed in claim 1.

7. A process for increasing the shrink resistance of textile materials which comprises treating said textile materials with a crease-resistant agent and a compound as claimed in claim 1.

WILLIAM BAIRD.
THOMAS BARR.
ARTHUR LOWE.

REFERENCES CITED

The following references are of record in the file of this patent:

UNITED STATES PATENTS

| Number | Name | Date |
|---|---|---|
| 2,303,191 | Baldwin | Nov. 24, 1942 |
| 2,380,133 | Waltmann | July 10, 1945 |